(12) United States Patent
Cooke

(10) Patent No.: US 9,415,785 B2
(45) Date of Patent: Aug. 16, 2016

(54) COMBINATION WHEELBARROW AND STEP STOOL

(71) Applicant: Reid Cooke, Cleveland, NC (US)

(72) Inventor: Reid Cooke, Cleveland, NC (US)

( * ) Notice: Subject to any disclaimer, the term of this patent is extended or adjusted under 35 U.S.C. 154(b) by 0 days.

(21) Appl. No.: 14/682,403

(22) Filed: Apr. 9, 2015

(65) Prior Publication Data

US 2015/0291195 A1    Oct. 15, 2015

Related U.S. Application Data

(60) Provisional application No. 61/978,258, filed on Apr. 11, 2014.

(51) Int. Cl.
*B62B 1/18*     (2006.01)

(52) U.S. Cl.
CPC ............. *B62B 1/18* (2013.01); *B62B 2206/006* (2013.01); *B62B 2501/065* (2013.01)

(58) Field of Classification Search
CPC ................................................ B62B 1/18–1/24
See application file for complete search history.

(56) References Cited

U.S. PATENT DOCUMENTS

| | | | | |
|---|---|---|---|---|
| 1,459,898 A | * | 6/1923 | Mulvihill | B62B 1/18 280/47.31 |
| 2,664,310 A | * | 12/1953 | Mueller et al. | 298/2 |
| 4,607,856 A | * | 8/1986 | Saleeba | 280/47.18 |

* cited by examiner

*Primary Examiner* — Jeffrey J Restifo
*Assistant Examiner* — Erez Gurari
(74) *Attorney, Agent, or Firm* — Shumaker, Loop & Kendrick, LLP

(57) ABSTRACT

The invention is a combination wheelbarrow and step stool. The invention includes a wheeled cart having a container with an open top and a set of inverted steps molded into the rear wall of the container. The wheeled cart operates in a hauling position for hauling materials and in a stool position for affording elevation above level ground. In the hauling position, the open top faces upward allowing material to be placed in the container. In the stool position, the container is flipped upside down so that the open top faces the level ground and the inverted steps form an ascending step stool.

6 Claims, 3 Drawing Sheets

COMBINATION WHEELBARROW AND STEP STOOL

CROSS REFERENCE TO RELATED APPLICATIONS

This application is a non-provisional of, traces priority to, claims the benefit of, and expressly incorporates by reference the entirety of U.S. Provisional Application No. 61/978,258, filed on Apr. 11, 2014.

TECHNICAL FIELD AND BACKGROUND OF THE INVENTION

The present invention relates generally to the field of material handling. More specifically, the invention relates to a combination of wheeled carts for the transportation of materials and step stools for vertical displacement of a human.

It is well known to utilize a wheeled cart for hauling and transporting many types of materials. Indeed, one of the earliest uses of the wheel was likely as an attachment to a cart having a compartment or container for hauling materials. The modern wheelbarrow typically has one or two wheels attached to a container with handles for transporting materials—though more than two wheels may be included. Wheelbarrows are commonly utilized both domestically around the house and also by professional contractors.

The storage vessel or container of the wheelbarrow typically has several side walls, a bottom floor, and a top opening so that materials may be deposited into and held within the bottom and side walls. Typically, the front wall is angled outward from the bottom towards the top to permit and aid the materials in being dumped from the container. Typically the single wheel or the pair of wheels is positioned close to the front wall to facilitate dumping of the contents.

As such, wheelbarrows may be utilized to haul and dump a variety of materials. Typically, wheelbarrows are utilized in landscaping, farming, and construction industries. For instance, they may be utilized in the mixing and hauling of cement, mortar, or concrete. They may be utilized in hauling soil, fertilizer, gravel, or sand. Similarly, they may be utilized in hauling lawn clippings, pruned branches, wood chips, mulch, or pine straw.

Much like the wheelbarrow, steps and stools have been utilized for many years. Step stools, ladders, scaffolding, and the like have been utilized in various ways and for various purposes in order to elevate a person vertically from a lower position to a higher position. For instance, upon ascending a step stool, a person may be able to reach an object positioned at a distance from the ground that was previously unreachable by the person.

Similarly, like the wheelbarrow, step stools and ladders are utilized in the field of material handling and especially in the landscaping, farming, and construction industries. For instance, a landscaper may utilize a stepstool in order to reach higher limbs on a tree or bush which require pruning. A farmer may utilize a stepstool in order to climb into the bed of a pickup truck or to reach implements positioned high in a barn. Likewise, a construction contractor may utilize a step stool in framing a structure, painting, installing plumbing and electrical conduit, or in hanging dry wall at an elevated position.

Therefore, under the current state of the art, it is common for many tasks to require both a step stool and also a wheeled cart such as a wheelbarrow. Thus, there is a need in the art for a device which combines the functionality of both wheeled cart and also a step stool.

SUMMARY OF THE INVENTION

It therefore is an object of the present invention to provide a device which combines the utility of both a wheeled cart and also a step stool. It is a further object of the present invention to negate the need to have a separate wheeled cart and a separate step stool. It is a further object of the present invention to provide a device which includes a level work or task surface. The work surface may be the top step.

These and other objects and advantages of the invention are achieved by providing a wheeled cart having an integrated step stool and work surface.

According to one embodiment of the invention, the wheeled cart has one or more wheels attached to a container and a pair of handles attached to the container. The container has an open top, two parallel sides, a sloped front side, a bottom, and a rear side. The rear side of the container has a plurality of steps formed into the rear side and the bottom is substantially flat so as to form a work surface.

According to another aspect of the invention, the wheeled cart operates in two positions, a hauling position and a stool position. In the hauling position, the open top faces upward away from the ground and the wheels touch the ground. In this position, the wheeled cart may be utilized for hauling materials in the container from one location to another.

In the stool position, the open top faces the ground and the rim of the open top may be in contact with the ground or other surface such as a floor. In this position, the wheeled cart may be utilized as a step stool. Further, in this position, the underside of the bottom of the container may be utilized as a level work surface. The level work surface may be the top step of the step stool.

According to another embodiment of the invention, the cart may include one or more legs displaced a distance from the wheels towards the handles for stabilizing the cart in a level position or a predisposed angled position, relative to level, when in the hauling position.

According to one embodiment, the steps extend between the legs. The legs may be attached to the cart in a fixed position. According to another embodiment of the invention, the legs may swivel away from the steps when the cart is in the stool position, the legs may retract into the container when the cart is in the stool position, or the legs may extend from the container to form safety handles when the cart is in the stool position.

According to another embodiment of the invention, the steps are molded into the rear side of the container such that the inverse of the steps is visible in when the cart is utilized in the hauling position.

According to another embodiment of the invention, the steps are attached to an external surface of the rear side of the container such that the internal surface of the rear side of the container is smooth and the steps are not visible from the inside of the container.

According to another embodiment of the invention, the container is made of wood, metal, plastic, or other composite material.

According to another embodiment of the invention, the container is water tight such that liquids may be contained or mixed in the container.

According to another embodiment of the invention, the steps of the step stool are equally spaced apart and include non-slip treads.

BRIEF DESCRIPTIONS OF THE DRAWINGS FIGURES

The present invention is best understood when the following detailed description of the invention is read with reference to the accompanying drawings in which.

DETAILED DESCRIPTION OF THE PREFERRED EMBODIMENT

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Figure 1:
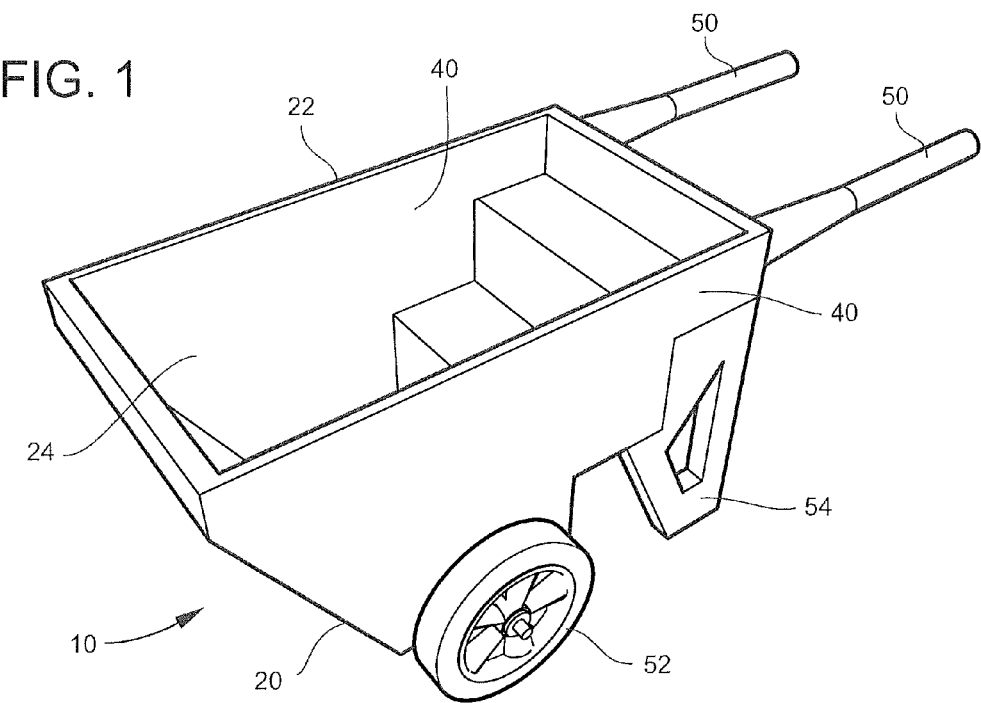
FIG. 1 is a perspective view of one embodiment of the invention.
Figure 3:
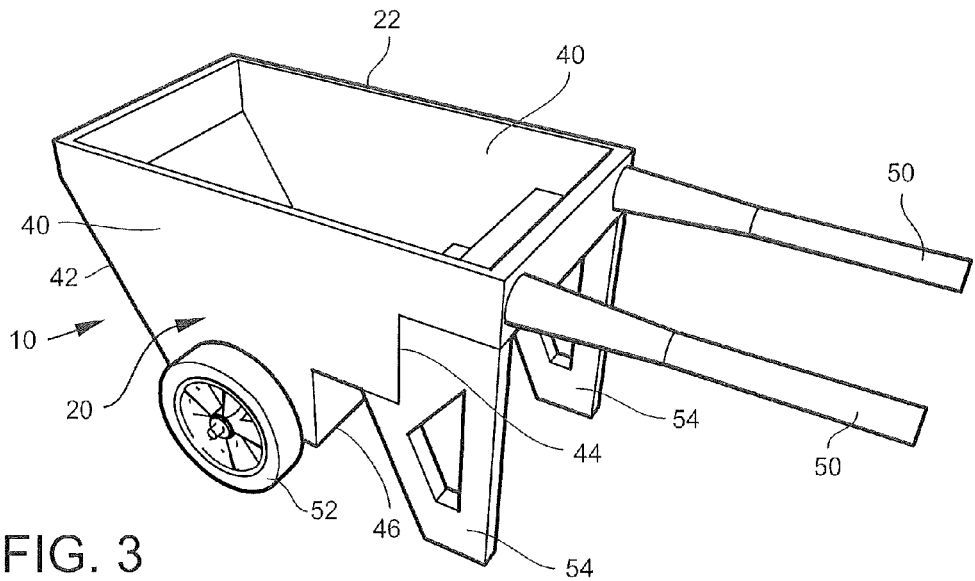
FIG. 3 is an isometric view of one embodiment of the invention in the hauling position.

Referring now to the drawings, FIG. 1 and FIG. 3 show the wheeled cart 10 in the hauling position. The wheeled cart includes a container 20 having a rim 22 defining a top opening 24. The wheeled cart 10 includes two parallel sides 40, an angled front side 42, a rear side 44 forming inverse steps, and a bottom 46 which may be the part of the inverse steps 44. The wheeled cart 10 includes a pair of handles 50 extending from the rim 22 of the container 20 and a pair of wheels 52 attached to the lower end of each of the parallel sides 40.

As can be seen in the Figures, the wheeled cart 10 includes one or more stabilizing legs 54. The stabilizing legs 54 are attached to the container 20 body and keep the wheeled cart 10 stable when in the hauling position of FIG. 1 and FIG. 3. The rim 22 and handles 50 are parallel with level ground 60 when in the hauling position. Also contemplated by the invention is an arrangement where the rim 22 and handles 50 are not parallel to the level ground 60 (not shown) but are arranged at a uniform angle to the level ground 60.

The container may be made of wood, metal, plastic, or a composite material. In a preferred embodiment, the container is made from molded plastic. In such an embodiment, the handles 50 and stabilizing leg(s) 54 may be molded as part of the container 20. Alternatively, the handles 50 and the stabilizing leg(s) 54 may be made of the same or a different material and may be attached to the container 20.

The wheels 52 preferably include a tire covering a rim. The tire is preferably made of a polymer plastic such as rubber. However, the tire may be made of metal, wood, or a composite material. Similarly, the rim is preferably made of metal though wood or rigid plastic are also contemplated. Though the figures show a pair of wheels 52, the invention contemplates use of a single wheel or more than two wheels. In embodiments which utilize a pair of wheels 52, the wheels 52 are attached to the bottom of the container 20. In alternative embodiments (not shown) the wheels may be attached to the parallel side walls.

The front wall 42 of the container 20 is preferably sloped downward from rim 22 to the bottom 46 at an angle toward the rear of the container 20. Such a slope may improve any pouring or emptying of the contents of the container. The bottom 46 of the container 20 is preferably flat and substantially level to level ground.

The rear wall 44 of the container 20 of the cart 10, when in the hauling position is shown in FIG. 1 and FIG. 3 as having inverse steps 44 molded therein. In the preferred embodiment, the steps 44 are molded as part of the container 20 as shown so as to "ascend" from the interior of the container 20, as can be best seen in FIG. 1, in the hauling position from the bottom 46 of the container to the top rim 20 of the container 20 nearest the rear of the container 20.

Figure 2:
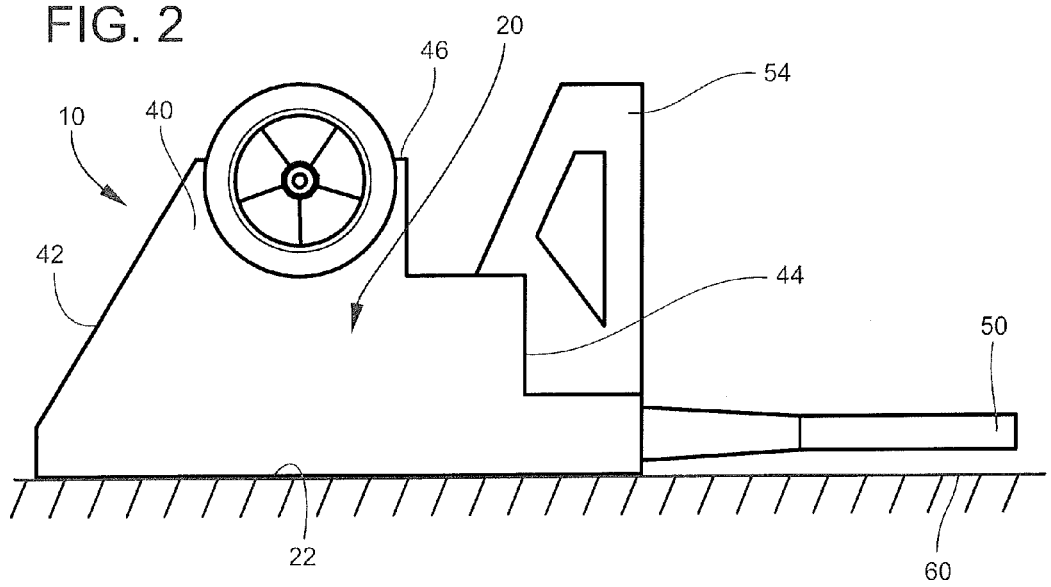
FIG. 2 is a side view of one embodiment of the invention in the stool position.
Figure 4:
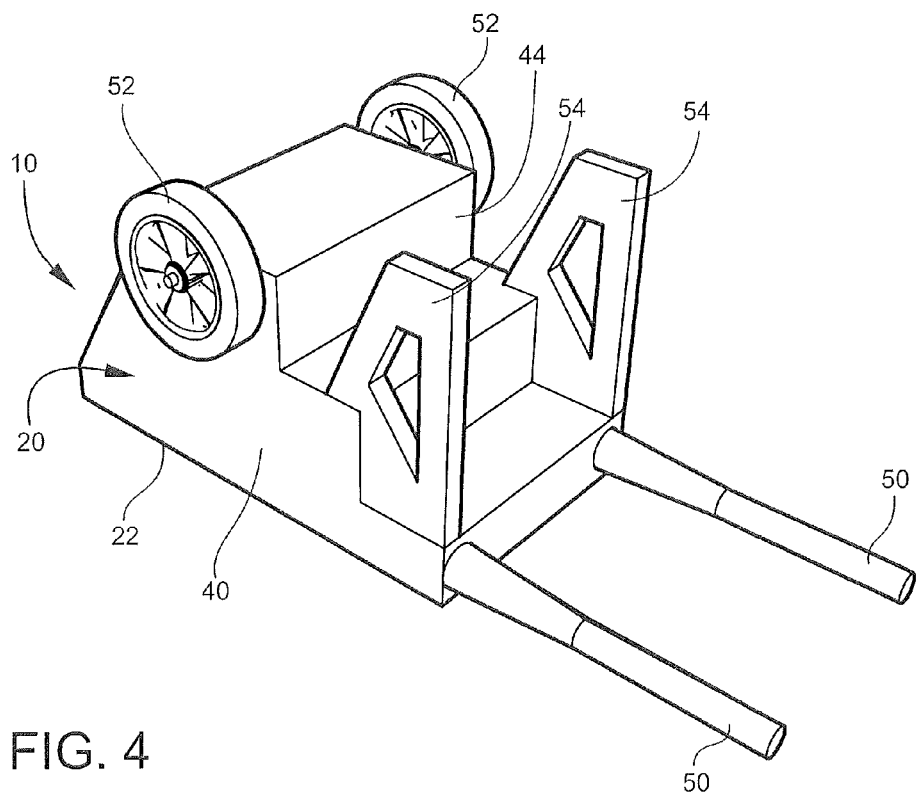
FIG. 4 is an isometric view of one embodiment of the invention in the stool position.
Figure 5:
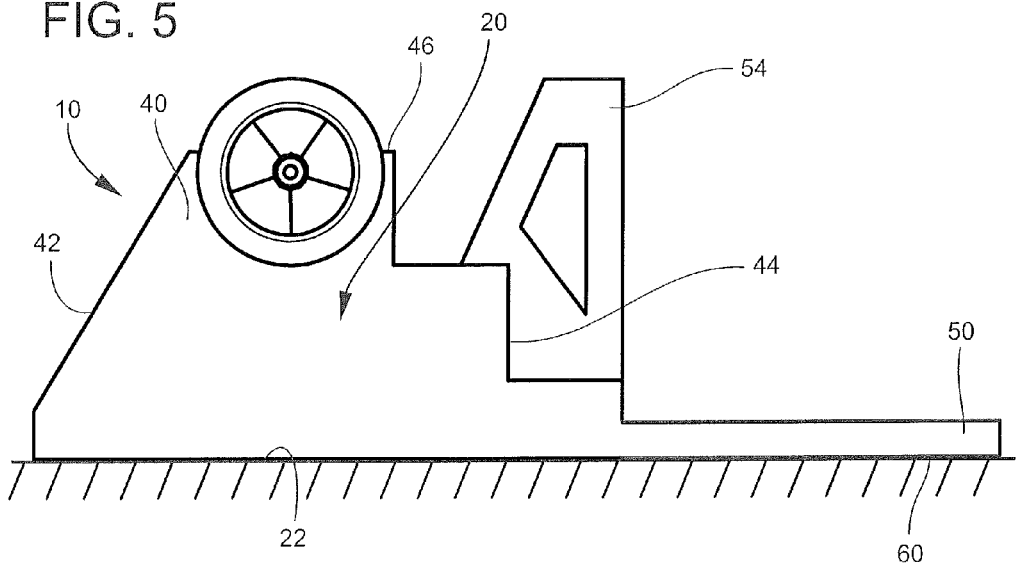
FIG. 5 is a side view of one embodiment of the invention in the stool position.
Figure 6:
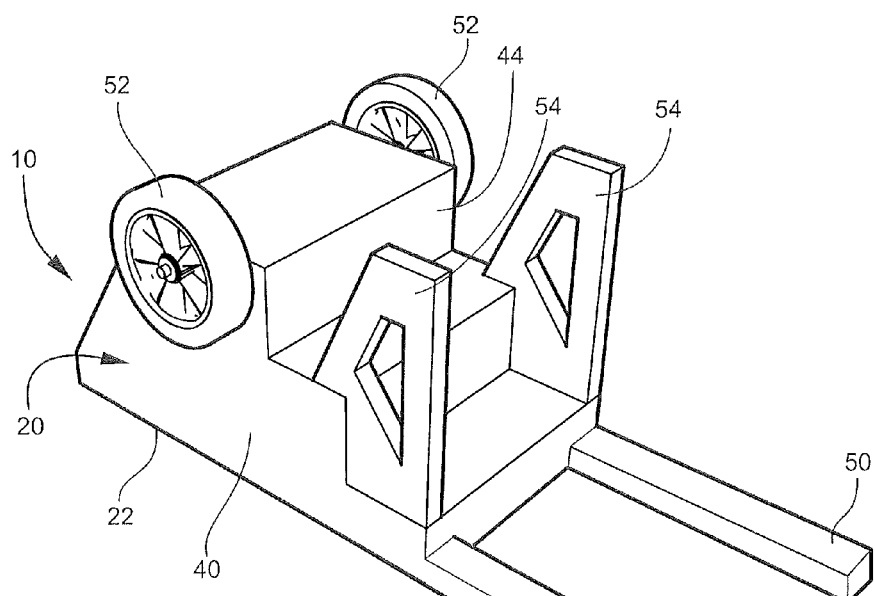
FIG. 6 is an isometric view of one embodiment of the invention in the stool position.

Referring now to FIG. 2 and FIG. 4, the cart 10 is shown in the stool position. In the stool position, the rim 22 of the container 20 is in contact with level ground 60 as can best be seen in FIG. 2. The handles 50 may also be in contact with level ground 60 (or nearly so) as shown. Being in contact with level ground 60 in this way, the container 20 has a firm foundation to function as a step stool. Viewed from the hauling position of FIG. 1 and FIG. 3, the inverted steps 44 become functioning steps in the stool position of FIG. 2 and FIG. 4. As such, in the stool position, the steps 44 ascend from the exterior rear of the container 20 at the rim 22 of the container 20 towards the bottom 46 of the container 20 nearest the front of the container 20. Preferably, each of the individual steps of the steps 44 is of equal height.

In FIG. 2 and FIG. 4, the additional functionality of the bottom 46 of the container 20 as a work surface can be seen. The flat exterior (outside) surface of the bottom 46 of the container 20 affords a level work surface. Such a work surface may function as a table or saw horse for those in the industry. Similarly, the flat exterior (outside) surface of the bottom 46 of the container 20 may act as a top step or platform for performing tasks at an elevated distance from the level ground 60.

A wheeled cart 10 having integrated steps according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A wheeled cart, operating in a hauling and a stool position, comprising:

a. a container having an open top defined by a rim and a plurality of side walls for carrying materials when the wheeled cart is in the hauling position;

b. a bottom wall, located in a position opposite the rim, wherein the bottom wall includes a work surface when the cart is in the stool position;

c. a plurality of steps formed in a rear wall of the container for elevating a person;

d. a pair of handles, wherein the pair of handles extends from a lowest step, nearest the ground when the wheeled cart is in the stool position, of the plurality of steps, wherein the pair of handles is configured to stabilize the cart when in the stool position, and wherein the pair of handles further comprises a bottom surface that is in contact with a lower supporting surface when the cart is in the stool position and wherein the bottom surface resides in the same plane as the rim; and e. a pair of legs positioned at either side of the plurality of steps, wherein the pair of legs are configured to stabilize the wheeled cart when in the hauling position;

f. wherein one or more wheels contact the round in the hauling position and the rim of the container contacts the ground in the stool position such that in the stool position, the wheeled cart is inverted relative the hauling position;

g. wherein the top step is substantially larger than the other plurality of steps and is configured to function as a work platform wherein a user may stand to perform a task;

h. wherein the pair of legs are configured to provide support for the user ascending the steps when the cart is in the stool position; and i. wherein the pair of legs are not attached to the top step.

2. The wheeled cart of claim 1 wherein the work surface is configured to be substantially flat and is also configured to function as a top step for the plurality of steps.

3. The wheeled cart of claim 1 wherein the rim, the plurality of side walls, the plurality of steps, the pair of handles, and the pair of legs are formed from molded plastic.

4. The wheeled cart of claim 3 wherein the plurality of steps are molded into the rear side of the container wherein an inverse of the steps is visible on the rear wall when the cart is in the hauling position.

5. The wheeled cart of claim 4 wherein the work surface is configured to be substantially flat and is also configured to function as a top step for the plurality of steps.

6. The wheeled cart of claim 5 wherein the top step is substantially larger than the other plurality of steps and is configured to function as a work platform wherein the user may stand to perform a task.

* * * * *